Sept. 1, 1959
E. WIESER
2,901,933
TWEEZER TYPE CABLE-STRIPPER
Filed Dec. 18, 1956
FIG. 1
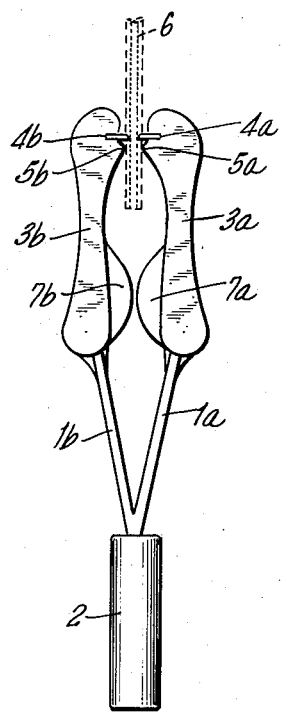
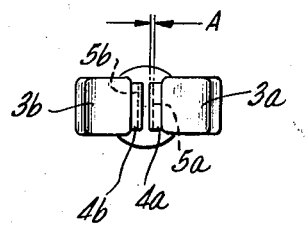
FIG. 2
INVENTOR.
EMIL WIESER
BY *Leon M. Strauss*
AGT.

2,901,933

TWEEZER TYPE CABLE-STRIPPER

Emil Wieser, Adliswil-Zurich, Switzerland

Application December 18, 1956, Serial No. 629,160

Claims priority, application Switzerland
December 18, 1955

4 Claims. (Cl. 81—9.5)

This invention relates to a cutting and stripping device. More particularly it relates to a device for cutting and stripping the insulation on cables to assist in the removal of the insulation.

Insulated electric conductors or cables and braided wires must be freed from their sheathing or covering prior to being connected or soldered. This may be done by means of a knife, but there is always the danger that the conductor itself may be damaged by too deep a penetration of the sharp blade, which is particularly detrimental at the stripped place by weakening the conductor.

Various cable strippers have heretofore become known. For example one with two knives mounted on resilient legs and meeting each other at the cutting edges, the legs having stops adjustably abutting against each other. According to the thickness of the cable being stripped, the distance apart of the knife blades is set by means of the adjustable stops in such a way that, on stripping, the conductor proper will not be damaged. This appliance suffers from the disadvantage that for each cable or each braided wire the distance apart of the blades must be measured and set anew.

Another stripping device consists of a two-bladed tongs, the blades having arranged thereon notches of varying sizes, generally of triangular form. The notch is chosen according to the core diameter of the actual conductor.

The cable stripper according to the present invention comprises two knife blades mounted on relatively flexible resilient legs, meeting each other at the cutting edges, and is characterized by stops arranged directly behind the blades, which in use engage the insulation, whereby the blades stand out beyond the stops by the thickness of the insulation, and thus prevent the outer insulation from being cut through entirely, and the inner conductor from being damaged.

The accompanying drawing illustrates by way of example a preferred form of embodiment incorporating the invention.

Fig. 1 shows a lateral view of the cable stripper, and
Fig. 2 is a top view thereof.

Mounted on two springing laminated legs 1a and 1b rigidly seated in a cylindrical handle 2, there are two bodies 3a and 3b as carriers of firmly positioned knife blades 4a and 4b with cutting edges facing in opposite directions. Directly below the blades, on each body 3a and 3b there is a stop 5a and 5b respectively. The legs 1a and 1b are integrally formed with each other as can be best seen in Fig. 1. With respect to the middle axis of the appliance, said stops are set back relatively to the cutting edge by the distance A.

The functioning of the appliance can be explained with reference to Fig. 1, wherein the cable 6 being stripped is indicated in dotted lines. The cable consists of a conducting core and the insulating covering thereof. The cable with the end to be stripped is positioned between the cutting edges. Then the blades 4 are closed like a tongs until the stops 5 have clamped the cable. The cutting edges standing out with respect to said stops will penetrate the insulation layer by the distance A. On pulling the outer part of the cable, the knife blades will retain the insulation lying within the appliance, and the core slips out therefrom. With firmly applied insulation the cable may be turned 90° within the blades to ensure better stripping by four cuts.

For stripping a cable it is not absolutely necessary that the whole covering be penetrated by the blades. Even a superficial weakening of the rubber insulation will be sufficient.

The knife blades may extend coplanar or may be slightly inclined towards the interior of the appliance so as to notch into the insulating material on stripping. It might also be conceivable to have the stops arranged directly above instead of below the blades. In the practical embodiment of the appliance the distance A is set at about $\frac{1}{10}$ mm. to $\frac{3}{10}$ mm., preferably $\frac{15}{100}$ mm.

As shown in Fig. 1, the bodies 3a and 3b may also incorporate cams 7a and 7b which would render impossible the complete closing of the appliance and the mutual damaging of the cutting edges.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A stripper and cutter for a cable having a conductor and an insulation thereon; comprising a handle, a pair of diverging flexible resilient legs secured to said handle, a pair of bodies mounted on said legs and carrying a pair of knives provided with cutting edges facing each other and adapted to approach each other during cutting operation, said bodies having stops arranged adjacent said knives for contacting the insulation on said cable, said knives standing out beyond said stops by the thickness of the insulation of said cable to thus prevent the conductor of said cable from being damaged.

2. A cable stripper according to claim 1, wherein said stops are disposed at a level below said knives and are integral with said bodies, said knives extending substantially coplanar with each other during said cutting operation.

3. A stripper and cutter for an insulated cable; comprising a handle, a pair of diverging flexible resilient legs secured to said handle, a pair of bodies mounted on said legs, a pair of knives carried by said bodies and adapted to approach each other with the cutting edges thereof during cutting operation, said bodies having first stop members arranged adjacent said knives for contacting the insulation on said cable, said knives standing out beyond said first stop members by the thickness of the insulation of said cable to thus prevent the inner conductor of said cable from being damaged, said bodies being provided with second stop members adapted to prevent the knives from contacting each other.

4. A stripper and cutter for a cable having an inner conductor and an insulation thereon; comprising a handle, a pair of diverging flexible resilient legs secured to said handle, a pair of bodies mounted on said legs, a pair of knives carried by said bodies and adapted to approach each other at the cutting edges of said knives, said bodies being provided with stops arranged adjacent said knives for abutting against said insulation on said cable, said knives standing out beyond said stops by the thickness of the insulation of said cable to thus prevent the inner conductor of said cable from being damaged, said diverging legs being integrally formed with each other and normally holding said knives apart, said stops being disposed adjacent said knives, and abutment means mounted on said bodies and abutting each other to prevent the knives from contacting each other and thus cutting said conductor of said cable.

References Cited in the file of this patent

UNITED STATES PATENTS

| | | |
|---|---|---|
| 1,619,181 | Beretz | Mar. 1, 1927 |
| 1,685,977 | Bollerman | Oct. 2, 1928 |
| 1,977,677 | Hill | Oct. 23, 1934 |
| 2,157,226 | Betz | May 9, 1939 |
| 2,667,094 | Potter | Jan. 26, 1954 |
| 2,721,383 | Nuller | Oct. 25, 1955 |